United States Patent [19]
Mlynczak et al.

[11] Patent Number: 4,657,727
[45] Date of Patent: Apr. 14, 1987

[54] FISSION PRODUCT BARRIER EMERGENCY EVENT CLASSIFICATION AND RESPONSE SYSTEM

[75] Inventors: Margaret M. Mlynczak; Michael E. Stern, both of P.O. Box 892, McLean, Va. 22101

[73] Assignees: Michael E. Stern; Margaret M. Mlynczak, both of Charlottesville, Va.

[21] Appl. No.: 662,088

[22] Filed: Oct. 18, 1984

[51] Int. Cl.4 .......................... G21C 17/00; G21C 7/36
[52] U.S. Cl. ..................................... 376/217; 376/245; 376/293
[58] Field of Search ........................ 376/217, 245, 293

[56] References Cited
U.S. PATENT DOCUMENTS

| | | | |
|---|---|---|---|
| 3,320,969 | 5/1967 | Gordon | 376/293 |
| 3,936,885 | 2/1976 | Mutafelija | 376/217 |
| 4,081,323 | 5/1978 | Gans, Jr. et al. | 376/293 |
| 4,107,533 | 8/1978 | Tabuchi et al. | 376/245 |
| 4,129,475 | 12/1978 | Spurgin et al. | 376/217 |
| 4,290,851 | 9/1981 | Ball et al. | 376/217 |
| 4,322,267 | 3/1982 | Kinoshita et al. | 376/216 |
| 4,421,716 | 12/1983 | Hench et al. | 376/216 |
| 4,552,718 | 11/1985 | Impink, Jr. et al. | 376/245 |

Primary Examiner—Salvatore Cangialosi
Attorney, Agent, or Firm—James C. Wray

[57] ABSTRACT

The present system uses measurement inputs which reveal fission product barrier functional characteristics for emergency event classification in nuclear generating stations. The process determines the functional status of barriers to fission product release under transient or emergency conditions. The first part of the present process specifies which key indicators within a nuclear plant provide data indicative of fission product barrier status, and develops a logic table or diagram relating specific key symptoms to barrier status such that a computer identifies the functional status of each fission product barrier. In the second part of the present process nuclear power plant operators utilize the computer to determine emergency event classification. The computer utilizes the present process, using the installed nuclear generating station instrumentation which indicates flow rates in fluid and air handling systems, pressures in pipes and vessels, temperatures in pipes and vessels, radiation levels and other indications of equipment status to determine whether the fission product barriers are functional at a given point in time according to the criteria established during the first part of the process. The implentation is an orderly process in which nuclear power plant operator uses the process as programmed on the computer to determine and correctly characterize the condition or status of each fission product barrier at any time. The process results in direct indication of the status of fission product barriers and of the categorization of the emergency event according to established classes of emergencies. If the computer is non-functional, the nuclear plant operator uses the process as presented in implementing procedures to determine the status of each fission product barrier and to determine the proper event clasification. The operator relies upon installed plant instrumentation to determine the functional status of the barriers according to the process.

7 Claims, 5 Drawing Figures

Real Time Process Implementation

Figure 5

| Symptoms | Fuel Barrier Breached | Reactor Coolant System Barrier Breached | Containment Barrier Breached |
|---|---|---|---|
| 1. REACTOR COOLANT RADIOACTIVE MATERIAL CONCENTRATION > _00 uCi/cc | X | | |
| 2. CONTAINMENT HIGH RANGE RADIATION MONITOR > _00 R/hr | X | X | |
| 3. AREA RADIATION MONITORS ABOUT EMERGENCY COOLING EQUIPMENT > _00 R/hr | X | EMERGENCY COOLING SYSTEM OPERATE DUE RCS BREACH | |
| 4. AREA RADIATION MONITORS ABOUT REACTOR COOLANT PURIFICATION EQUIPMENT >> THAN NORMAL OPERATING CONDITIONS | X | | |
| 5. INABILITY TO MAINTAIN NORMAL LEVEL IN THE REACTOR COOLANT SYSTEM DUE TO UNIDENTIFIED LOSS OF INVENTORY | | X | |
| 6. LOSS OF REACTOR COOLANT SYSTEM PRESSURE | | X | |
| 7. LOSS OF REACTOR COOLANT SYSTEM INVENTORY | | X | |
| 8. DETECTION OF SIGNIFICANT LEVEL OF WATER IN THE CONTAINMENT | | WHEN 10 IS ALSO PRESENT | |
| 9. INCREASE IN CONTAINMENT TEMPERATURE, PRESSURE, AND HUMIDITY | | WHEN 6, 7, 10, OR 12 IS ALSO PRESENT | |
| 10. NORMAL CONTAINMENT RADIOACTIVE MATERIAL CONCENTRATION MONITORS OFFSCALE HIGH OR INCREASING TO VALUES >> NORMAL | WHEN 8, 9, OR 12 ARE NOT PRESENT | WHEN 1 IS NOT PRESENT | |
| 11. MAJOR INCREASE IN RADIOACTIVE MATERIAL IN CONTAINMENT OR STEAM GENERATORS ON PWR'S | | X | |
| 12. CONTAINMENT WATER LEVEL INCREASE IN SUMPS OR SUPPRESSION POOL | | WHEN 10 IS PRESENT | |
| 13. CONTAINMENT AREA RADIATION MONITORS > NORMAL REACTOR SHUTDOWN LEVELS | | X | |
| 14. CONTAINMENT AREA RADIATION MONITORS > _00 R/hr | X | | |
| 15. STEAM LINE LOW PRESSURE | | | WHEN 9 IS NOT PRESENT |
| 16. STEAM-FEED FLOW MISMATCH | | | WHEN 9 IS NOT PRESENT |
| 17. RADIOACTIVE MATERIAL MONITORS WITHIN THE AUXILIARY BUILDINGS ARE > NORMAL OPERATION | | | WHEN 1 IS NOT PRESENT |
| 18. RADIOACTIVE MATERIAL MONITORS WITHIN THE AUXILIARY BUILDINGS ARE >> NORMAL OPERATION | X | X | X |
| 19. STEAM LINE RADIATION MONITORS ARE OFF SCALE HIGH OR > _ R/hr | X | X | X |
| 20. PLANT VENT RADIOACTIVE MATERIAL MONITORS ARE > _ Ci/sec (NOT A SHORT TERM CONDITION) | X | | X |
| 21. RADIATION LEVELS IN NUMEROUS LOCATIONS> _00 R/hr | X | | |
| 22. DETECTION OF _000 Ci OF RADIOACTIVE MATERIAL IN TANKS AND SYSTEMS BEYOND THE CONTAINMENT BOUNDARY | X | | X |

FISSION PRODUCT BARRIER EMERGENCY EVENT CLASSIFICATION AND RESPONSE SYSTEM

BACKGROUND OF THE INVENTION

In response to the accident at Three Mile Island Unit 2, the federal government has required the development of symptom-related emergency operating procedures by utilities which operate nuclear power plants. The main objective of such procedures is to ensure that proper mitigating actions are implemented by licensed operators in the event of an accident. In addition, the criteria for implementing such mitigating actions identified in the emergency operating procedures must be based solely upon indications or symptoms observable by licensed operators using instrumentation within the control room of a nuclear station. The federal government has required the development and installation of instrumentation which can be used by operators in the control room to identify symptoms which are indicative of transient or accident conditions. Prior to the accident at Three Mile Island Unit 2, the typical response by an operator in a control room during a transient was to attempt to identify the event in progress and then to locate and implement a specific event mitigating procedure associated with the identified event. Since the accident at Three Mile Island Unit 2, the federal government has required utilities to develop emergency operating procedures which can by used by operators to mitigate emergency events independent of identification of their causes. The development of these symptom-related emergency operating procedures was intended to remove the possible errors an operator might make in trying to identify an event prior to attempting to mitigate it. Errors in event identification are possible by trained and licensed operators due to the vast numbers and combinations of possible indications which could appear on control room instrumentation due to different types of transients and accidents. The federal government and nuclear industry have acknowledged that the accident at Three Mile Island Unit 2 could have been mitigated had the operators utilized built-in plant features and responded to indications which identified a need for mitigating actions, rather than attempting to identify the event and to implement the proper mitigating procedures for the named event.

The means to classify emergency events so as to properly activate state and local governments has not in general improved in the same manner as emergency operating procedures since the accident at Three Mile Island Unit 2. Current federal regulations regarding event classification specify that four levels of emergency events be established and referenced in the emergency response plans for nuclear generating stations. Current federal guidance documents present general emergency class descriptions and detailed lists of example initiating conditions which were considered to be representative of each specific emergency class. As a result of following this guidance utilities have typically developed means to classify emergency events within nuclear power stations by requiring the licensed operator to identify the event in progress and to correlate the identified event to the listing associated with each emergency class presented in the federal guidance. This approach to emergency classification is currently employed by the majority of operating nuclear power stations and is consistent with federal requirements and guidance. This method of event classification requires the correct identification of the emergency event to ensure proper classification and to facilitate appropriate responses by state and local governments to ensure public protection. The result of this approach has been to introduce or maintain the existence of the same source of error, i.e., failure to properly identify the event, which was most significant in the accident at Three Mile Island Unit 2.

SUMMARY OF INVENTION

Emergency classification must be independent of the event cause and subsequent development so as to minimize the effect of potential errors associated with nuclear plant operators' responses to perceived causes of events which may not be correct and consistent with protecting the general public. Emergency event classification methods and procedures must be consistent with emergency operating procedures. The present invention provides the means to classify emergency events which is independent of event identification, which confirms the area of hazard and auguments emergency operating procedures developed by the utilities operating nuclear generating stations subsequent to the accident at Three Mile Island Unit 2, and constitutes a major improvement in public safety. In addition, the present invention utilizes a computer to accomplish the comparison of symptoms of an emergency event to a logic matrix which corresponds to the various classifications for emergency events, and thus greatly assists operators in event classification.

The present invention classifies actual and potential emergency conditions at commercial nuclear generating stations. This emergency event classification process is directly related to three barriers to fission product release to the environment. Since 1970, the design of nuclear power plants has been governed by the General Design Criteria specified in the Code of Federal Regulations, Title 10, Part 50, Appendix A. In particular, Criteria Nos. 10, 13, 14, and 16 identify three fission product barriers which are intented to prevent the uncontrolled release of radioactive material to the environment. The three fission product barriers are the reactor core (intergrity of the fuel cladding), the reactor coolant system pressure boundary, and the containment. The functional integrity of any of the three boundaries is sufficient to prevent the uncontrolled release of radioactive material to the environment. The loss of function any one barrier constitutes a significant reduction in the level of safety of a nuclear generating station. The implementation of the process requires rigorous analysis to determine appropriate values which characterize the functional integrity of the fission product barriers. This process establishes functional performance criteria for each fission product barrier such that the symptoms associated with degradation of any single barrier, or with degradation of several barriers or combinations of barriers are unambiguous, unique and identifiable. A computer is programmed to use the indications of barrier degradation to identify the magnitude of the hazard to the general public which exists when these indications are present. Using the computer, the nuclear power plant operator properly classifies emergencies at nuclear stations and automatically advises offsite authorities of the hazard associated with plant emergency conditions.

Definitions regarding the operability of each fission product barrier are included in the license to operate each nuclear generating station. However, the definitions associated with conditions stated in operating licenses are appropriate only during plant operation and cannot be directly utilized to define emergency event classes. The process of implementation of the fission product barrier approach to emergency event classification is the determination of and use of functional indications in a nuclear generating station's control room of fission product barrier integrity. The process is a unique concept which is applicable to all power reactors which are designed in accordance with the Code of Federal Regulations, Title 10, Part 50, Appendix A, General Design Criteria. The process directly relates the loss of fission product barrier function to a specific emergency event classification. Events which are off-normal and which do not represent a loss of function of any of the three fission product barriers, but are of sufficient interest to warrant activation of a nuclear plant''s emergency plan, are classified as a "Unusual Events". Events resulting in the loss of function of one fission product barrier are classified as "Alerts". Events resulting in the loss of function of two fission product barriers are classified as "Site Area Emergencies". Events resulting in the loss of all three fission product barriers are classified as "General Emergencies". The criteria stated within a nuclear generating station's emergency plan for fission product barrier function are properly determined using the present invention to provide margin between limiting conditions for operation associated with characteristics of fission product barrier function (the normal upper limit of certain critical parameters monitored during normal plant operation) and minimum criteria for emergency plan activation and event classification. Such a margin precludes activation of the emergency plan due to simply exceeding a limiting condition for operation associated with a fission product barrier. Additionally, proper selection of the functional criteria for barrier function according to the present invention allows the licensed operator to recognize in a nuclear plant's control room the display of unique symptoms associated with the breach of individual fission product barriers, and all the possible combinations of breaches of fission product barriers. The operator can then readily identify the functional status of all fission product barriers employing the computer, whose output is verified by indications available within each plant's control room.

The main objective of emergency preparedness efforts for commercial nuclear generating stations is to limit the radiation dose which might be received by the general public in the event of an accident having offsite radiological consequences. Federal emergency preparedness regulations require classification of any emergency condition according to a graded system commensurate with the hazard presented to the public.

Radiation dose to the general public located in the vicinity of a nuclear generating station can be characterized approximately in the following relationship:

$$DOSE \alpha f(\phi, t_o, u/p, t_d) \times f(w) \times f(s) \times f(L_F) \times f(L_{RCS}) \times f(L_C)$$

where, during an event, relatively fixed functions are:

$f(\phi, t_o, u/p, t_d)$ is the source term, a value related to the amount of radioactive material which exists in the fuel, the form of that material and the volatility of the material. The source term is related to reactor power, ($\phi$); to the time of operation, ($t_o$); to fuel characteristics, (u/p); and time after shutdown, ($t_d$); among other factors;

f(w) is a function related to meteorological conditions at the time of release of radioactive material;

f(s) is a function of site demographic characteristics;

And where relatively variable functions are:

$f(L_F)$ is a function of the leak rate of the reactor fuel cladding;

$f(L_{RCS})$ is a function of the leak rate of the reactor coolant system;

$f(L_C)$ is a function of the leak rate of containment systems.

The above relationship is a qualitative relationship which illustrates how the barrier functions relate to offsite dose calculations, and is not intended to present a strict quantitative relationship.

The reactor fuel is contained within the fuel cladding within the reactor coolant system, which is itself contained within the containment system. The fuel cladding (essentially a metallic shell which encapsulates the fuel), the reactor coolant system and the containment system constitute three barriers to release of radioactive material from the reactor fuel to the environment. The complete functioning of any one of these three barriers presents a sufficient obstacle to prevent the release of radioactive materials to the environment. If the numerical value of any one of the three functions $f(L_F)$, $f(L_{RCS})$, or $f(L_C)$, presented above is equal to zero or is very nearly zero, the offsite radiation dose to the general public is also very nearly zero or equal to zero since all of the other functions have finite values.

The values of $f(\phi, t_o, u/p, t_d)$ and $f(s)$ are determined by considerations unrelated to any nuclear power plant transient or accident and can be considered constants. f(w) may be determined by weather characteristics; it cannot be changed by any action by nuclear station operators and can be considered a constant for purposes of implementation of the present system.

The only terms which are influenced by specific transients or emergency events are $f(L_F)$, $f(L_{RCS})$, and $f(L_C)$. To present a signficant hazard to the public an accident must significantly influence the leak rate, i.e., the means by which and rate at which radioactive materials are being transported across any of the three barriers.

The operators of nuclear power stations are required to determine the magnitude of hazard to the health and safety of the public which exists during any emergency situation and are required to classify the hazard into four categories, progressing from the less serious to the most serious hazard to the public. While it would seem that the quantification of $f(L_F)$, $f(L_{RCS})$, and $f(L_C)$ would significantly aid in the determination of the hazard level, the representation or calculation of each of these functions in an absolute manner is extraordinarily difficult due to the complexity of the processes and the number of parameters which relate to status of each barrier. It is possible, however, to empirically assess whether each barrier exists (is functional) and is adequate to provide the degree of protection sought. To accomplish this assessment it is necessary to develop a functional definition of each fission product barrier and then, during any event, to determine if the function is being maintained. This determination of functional requirements for the fission product barriers constitutes the first part of the process of implementation of the fission product barrier emergency event classification and response system. The steps taken, in real time, by the nuclear power plant operator and the computer to utilize nuclear plant instrumentation to identify the functional status of fission product barriers so as to classify an event is the second part of the subject process.

Considerations associated with quantification of the function of the fission product barriers, $f(L_F)$, $f(L_{RCS})$, and $f(L_C)$, are now discussed.

$f(L_F)$ Function of the Reactor Fuel as a Fission Product Barrier

The fuel of a light water nuclear power reactor is comprised of ceramic pellets which are enclosed in metal tubes, referred to as fuel cladding. The length of these tubes is typically between 10 and 14 feet, with a length of 12 feet being most common. Each tube is a pressure vessel and as such is a leak-tight enclosure. Operational limitations are placed upon nuclear power plants so as to prevent the degradation of the integrity of the fuel cladding. During operation of the reactor the fuel material is transformed by the fission process to yield a distribution of various elements (fission products) some of which are gaseous. A portion of the gaseous fission products migrates to the void between the fuel matrix and the cladding tube and mixes with inert gases located in that void area or gap. Individual fuel rods are verified to be leak tight upon initial fabrication. During operation within a reactor, mechanical wear, internal pressure generation, metal fatigue and creep due to pressure variations result in minor degradation of the fuel cladding. During accident conditions, changes in the environment around the fuel due to changes in coolant flow rate, temperature and pressure may result in significant stresses upon the cladding material such that rupture, local melting, and chemical interactions with other materials can occur which may result in the loss of integrity of individual tubes containing fuel. The loss of that integrity results in the transport of radioactive material from within the tube to the area outside of the tube, i.e., to the reactor coolant system in which all fuel is contained. Typical power reactors contain tens of thousands of individual fuel tubes assembled in bundles called fuel elements. Due to the number of such fuel tubes it is not possible to monitor each tube for indication of pressure or any other physical parameter so as to determine the integrity of individual tubes. Integrity is inferred by the determination of the concentration of radioactive materials within the reactor coolant system using plant instrumentation. Since the only source of fission products is from the fuel, the detection of fission products within the reactor coolant system indicates the existence of degradation of one or more fuel tubes. Low levels of degradation have been considered in the design of nuclear power plants and limitations regarding the maximum allowable reactor coolant system radioactive materials concentrations have been established for each reactor so as to assure adequate functioning of the fuel cladding as a barrier to significant radioactive material transport and possible release of radioactive material to the environment during normal operation.

The establishment of a numerical value for the concentation of radioactive material in the reactor coolant system in effect establishes criteria for consideration that the integrity of the fuel cladding as a barrier to fission product release is adequate and therefore that the barrier is functional. The invention establishes the criteria for selecting a particular radioactive material concentration as an indication that the fuel barrier is functional for the purpose of emergency event classification.

The amount of radioactive material located within the fuel cladding is overwhelmingly the largest source of radioactive material within a nuclear power plant. The gaseous fission products located within the gap between the fuel pellets and the cladding inner surface amount to millions of curies of radioactive material. The allowable concentration of radioactive material present within the reactor coolant may amount to thousands of curies with normal concentrations being typically a few hundred curies or less.

The process establishes the functional definition of the fuel as a fission product barrier by examining in detail many characteristics of a specific nuclear power plant related to plant systems, equipment performance characteristics, equipment locations, operating procedures, instrumentation displays within the control room, accident analysis results, and normal plant operating limitations.

$f(L_{RCS})$ Function of the Reactor Coolant System as a Fission Product Barrier The reactor coolant system of a nuclear power plant operates at high temperature and pressure so as to provide thermal energy in the form of heated steam to a turbine generator for the purpose of generating electricity. The reactor coolant system contains the reactor coolant water which has an average temperature in the range of 550 degrees Fahrenheit. All reactor coolant systems include instrumentation to inform the operator in the control room that adequate coolant inventory exists within the system. Minor leakage from the reactor coolant system occurs due primarily to the large number of mechanical seals on the system and the high differential pressure across those seals. The normal reactor coolant inventory is maintained by pumping systems which provide additional coolant to the system as necessary to maintain proper inventory.

In the event of significant degradation of the reactor coolant system pressure boundary, additional pumping systems may be required to operate to maintain an adequate coolant inventory within the reactor coolant system.

The reactor coolant system is located within a pressure vessel referred to as the containment. The environmental conditions and concentration of radioactive materials within the containment are monitored by the reactor operator. Degradation of the reactor coolant system pressure boundary results in the transport of reactor coolant to areas within the plant which would not normally experience the existence of radioactive materials in the concentration normally present within the reactor coolant system. In addition, since reactor coolant is at a high temperature, the transport of a significant amount of reactor coolant across the reactor coolant system pressure boundary results in significant energy transfer as well as the transfer of mass. Since the transfer of energy and mass will be to an enclosed system, the environmental conditions, radioactive material concentrations and mass of liquid located within the enclosed recipient system will reflect the transport of reactor coolant.

The function of the reactor coolant system as a fission product barrier is manifested by the absence of the transport of radioactive materials, energy and mass into enclosed systems of a nuclear power plant which are designed to contain significant leakage or rupture of reactor coolant. In addition the ability to maintain reactor coolant inventory employing normal operating systems is also indicative of the integrity of the reactor coolant system and its ability to function as a fission product barrier. The specific characteristics of a breach of the reactor coolant system fission product barrier coupled with the operating characteristics of the reactor coolant system determine the specific combination of indications which will be manifested. Regardless of the type of failure or type of reactor considered, the invention establishes a characteristic description of symptoms exhibited by a loss of function of the fission product barrier associated with the reactor coolant system.

f($L_C$) Function of the Containment as a Fission Product Barrier

The containment of a nuclear power plant is a large pressure vessel designed to contain the energy and mass release resulting from a major rupture of the reactor coolant system, among other considerations. The environmental conditions within the containment provide information to the nuclear plant operator relative to the function of the reactor coolant system as a fission product barrier. Similarly the environmental conditions in the buildings which surround or are contiguous with the containment provide information regarding the integrity of the containment, and thus of its ability to function as a fission product barrier. Such buildings are equipped with monitoring equipment which functions continuously to inform the operator of the concentration of radioactive materials within those areas.

The radioactive material concentration within plant buildings is low in comparison with the radioactive material concentration in containment. The identification of the presence of significant radioactive material concentrations beyond the containment fission product barrier is indicative of a degraded barrier. The transport of radioactive material to areas beyond the containment boundary constitutes the lack of containment and lack of functioning of the containment as a fission product barrier. Federal requirements for nuclear power stations specify enclosure of the reactor coolant system totally within the containment. The process compares concentrations of radioactive material within containment during an emergency event and the concentration of radioactive material being transported to the environment to define the function of containment as a fission product barrier.

BRIEF DESCRIPTION OF THE DRAWINGS

FIG. 5 illustrates examples of symptoms associated with specific barrier breaches.

DETAILED DESCRIPTION OF THE DRAWINGS

Figure 1:
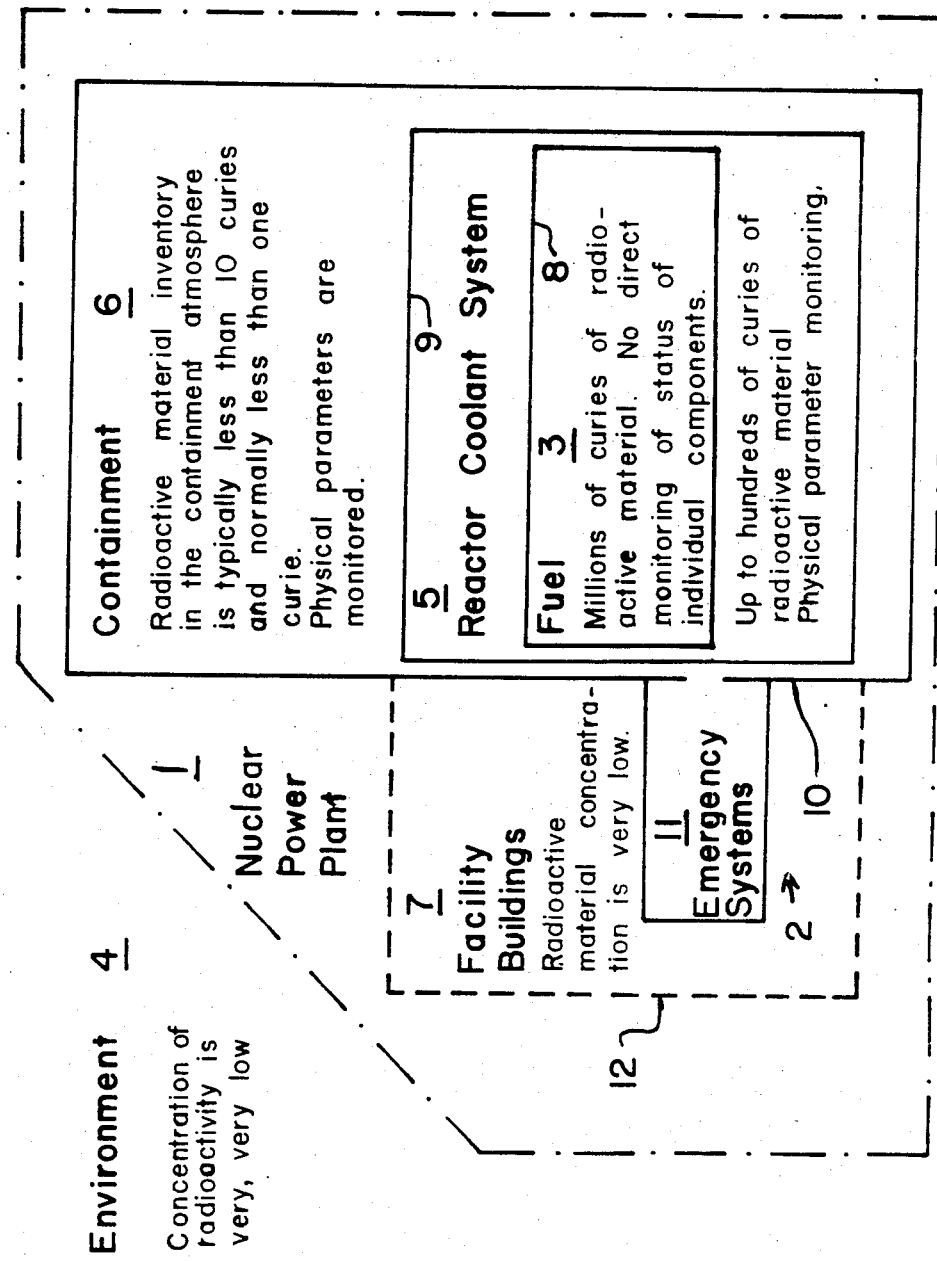
FIG. 1 is a schematic representation of a nuclear power plant.

The normal inventory of radioactive materials within a nuclear power plant, 1, and plant systems, 2, are represented in FIG. 1. The concentration of radioactive material is highest in the fuel, 3, and lowest in the environment, 4,. A progressive decrease of total radioactive material inventory exists as the point of consideration moves from the fuel, 3, to the reactor coolant system, 5, to containment, 6, to plant buildings, 7, and finally to the environment, 4. In addition to the reduction in total inventory, the concentration (the amount of radioactivity per unit volume) decreases to an even greater extent since the volumes of interest typically increase by two orders of magnitude, namely, by a factor of 100, with each step toward the environment.

In FIG. 1, the fuel barrier, 8, is the cladding around each fuel element which prevents or retards passage of radioactive materials. The reactor coolant system barrier, 9, is the combination of pipes, pumps, valves, and couplings which confine the primary coolant. The containment barrier, 10, including emergency systems, 11, are the reinforced concrete and/or steel vessel or components represented as a solid line. The dashed lines, 12, around facilities buildings representing building walls are not considered fission product barriers as described and used in the present process.

Figure 3:
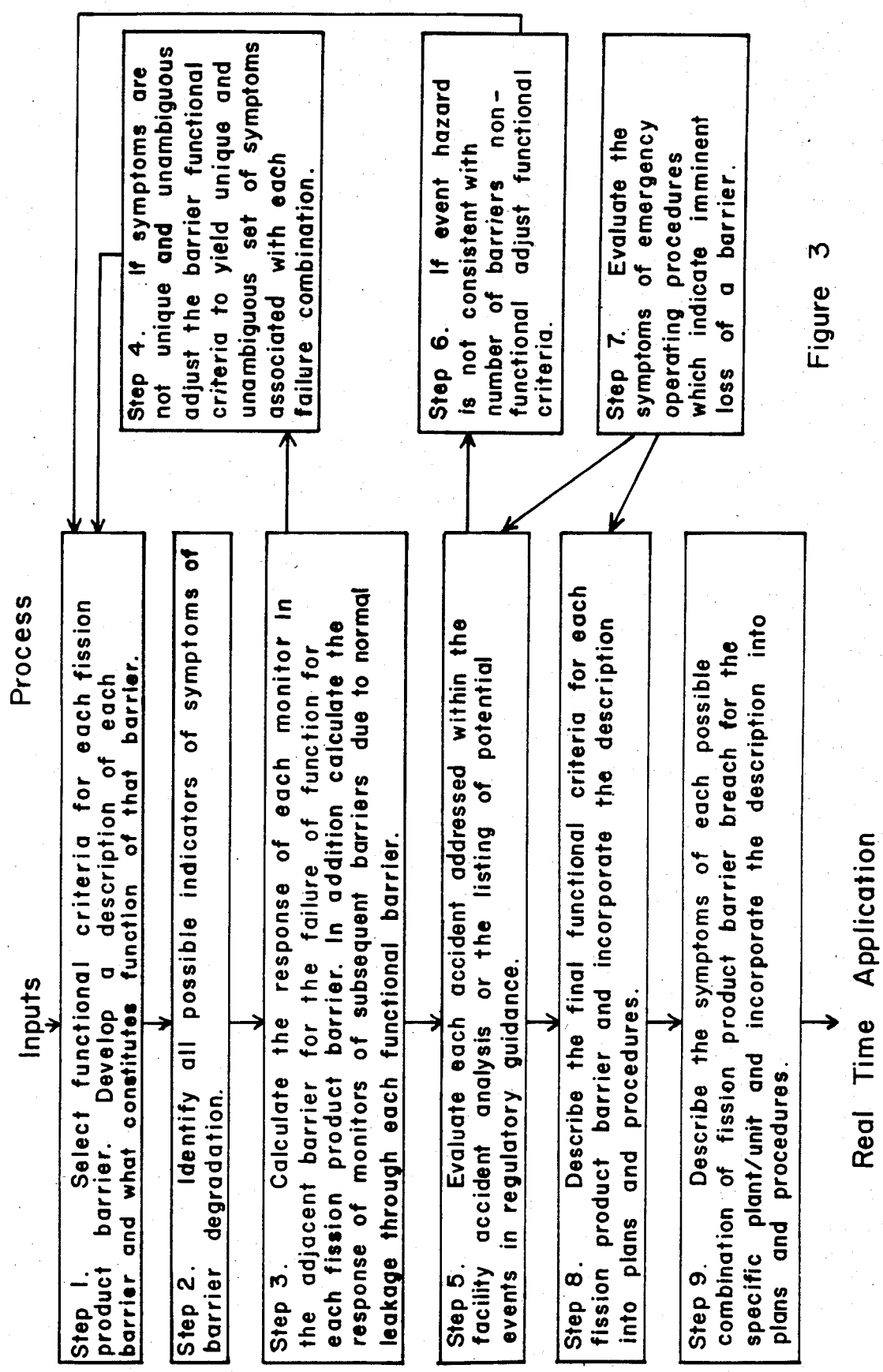
FIG. 3 is a representation of steps in establishing barrier symptoms.

The first part of the present process, represented in FIG. 3, establishes a functional definition of each fission product barrier such that the loss of function of any barrier or each possible combination of losses of functions of multiple barriers results in unique, unambiguous, pervasive symptoms manifested within the control room of a nuclear power plant by indicators which are identifiable the computer and by a licensed operator. The first part of the process comprises:

1. Development of preliminary definitions for barrier function, for each fission product barrier;
2. Identification of all possible indicators of environmental, radiological, or process-related parameters which have the potential to indicate symptoms of fission product barrier degradation throughout the facility during an emergency;
3. Evaluation of the response of each possible indicator to changes in the functional status of each fission product barrier;
4. Adjustment of functional status definitions so as to yield distinguishable symptoms for each possible combination of barrier loss of function, i.e., confirm that the criteria for functional status corresponds to the objectives above;
5. Evaluation of each accident addressed within the safety analysis report for the facility, in regulatory guidance regarding emergency events, and other potential emergency events to determine if the correlation between classification employing the number of fission product barriers breached corresponds to the perceived hazard of each possible accident;
6. Assess each inconsistency to determine if the functional criteria for each barrier require adjustment, or if the perceived hazard stated in regulatory guidance or other documents is inconsistent with actual hazard and that the actual hazard is qualified by the approach to event classification;
7. Evaluate the emergency operating procedures and event mitigating guidelines used by nuclear plant operators to identify the specific challenges to each fission product barrier which are of such a magnitude that prevention of barrier breach is unlikely, such that preemptive presumption of the associated fission product barrier's breach is appropriate, so as to augment emergency response activities at the earliest reasonable time, classifying as if the challenged barrier were breached prior to indications of actual breach.
8. Development of final barrier functional criteria and definitions including preemptive conditions associated with barrier challenge which are deemed to constitute barrier breach;
9. Description of the unique symptoms which correspond to each possible combination of fission product barrier breaches utilizing the results of Steps 1-8 in the symptom logic matrix;
10. Programming of the symptom logic matrix for use on a control room computer. Programming the computer to automatically alert and notify offsite authorities (state and local government officials) of the emergency event classification.

Upon completion of the first part of the process as presented in Steps 1-10 above the objective of developing a functional definition for each fission product barrier is achieved and a set of facility-specific symptoms which correlate to each possible combination of fission product barrier status is defined in the form of a logic matrix. The logic matrix is programmed using a control room computer. These two results of the first part of the process constitute information necessary to accomplish emergency classification in real time at the nuclear station considered in the process.

Figure 4:
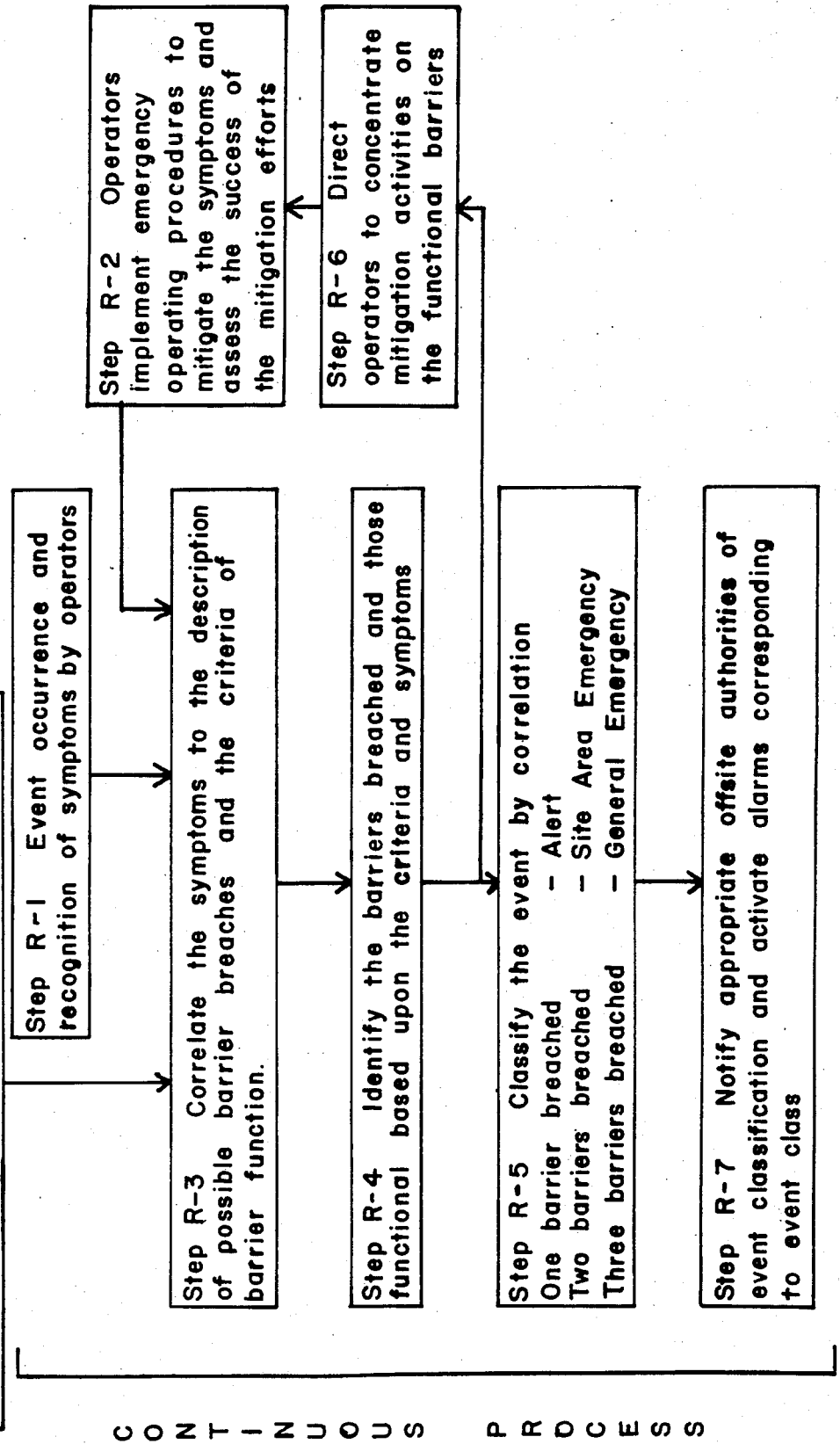
FIG. 4 is a representation of real time steps in determining actual barrier conditions and reacting.

The second part of the process, represented in FIG. 4, is the application of the results of Steps 1-10 above in real time during an emergency event. The second part of the process accomplishes real time emergency event classification by the computer, by licensed nuclear plant operators, managers or other responsible technical personnel, by computer, or by plant personnel using the computer as an event classification decision aid. The second part of the process consists of presentation of and recognition of symptoms, correlation of facility symptoms to the barrier function criteria, description of the symptoms generated during the first part of the process to identify the fission product barriers breached, classification of the emergency event per the number of fission product barriers breached using the logic matrix, and automatic notification of offsite authorities. The process also identifies the fission product barriers which have been breached and are non-functional and identifies the remaining barriers for which efforts to mitigate degradation can be applied to prevent the release of large amounts of radioactive material to the environment.

The real time application of the process consists of:
1. Recognition of symptoms;
2. Implementation of mitigating actions as defined in emergency operating procedures;
3. Correlation of symptoms to the logic matrix;
4. Determination of the status of each fission product barrier;
5. Classification of the emergency event.
6. Direct concentration of mitigation activities on remaining functional fission product barriers.
7. Notification of offsite authorities and plant personnel of the emergency event classification.

It should be noted that the real time application of the process is a continuous looping process executed by the computer, by the operator, or by the operator using the computer as a decisional aid. Continuous assessment, comparison, recognition, mitigating procedure implementation, and classification are actions taken by the operator. Continuous assessment, comparison, recognition, classification and notification are actions taken by the computer. Live time variations in symptoms, errors, failures of equipment, or other considerations are updates to the process input information which are accommodated by cycling through the assessment, comparison, recognition, mitigation and classification process to yield an updated emergency event classification and overall assessment of the actual hazard to the health and safety of the public. This process is continued throughout the duration of the emergency event by the computer or by the operators.

STEPS IN APPLICATION OF THE PROCESS

Figure 2:
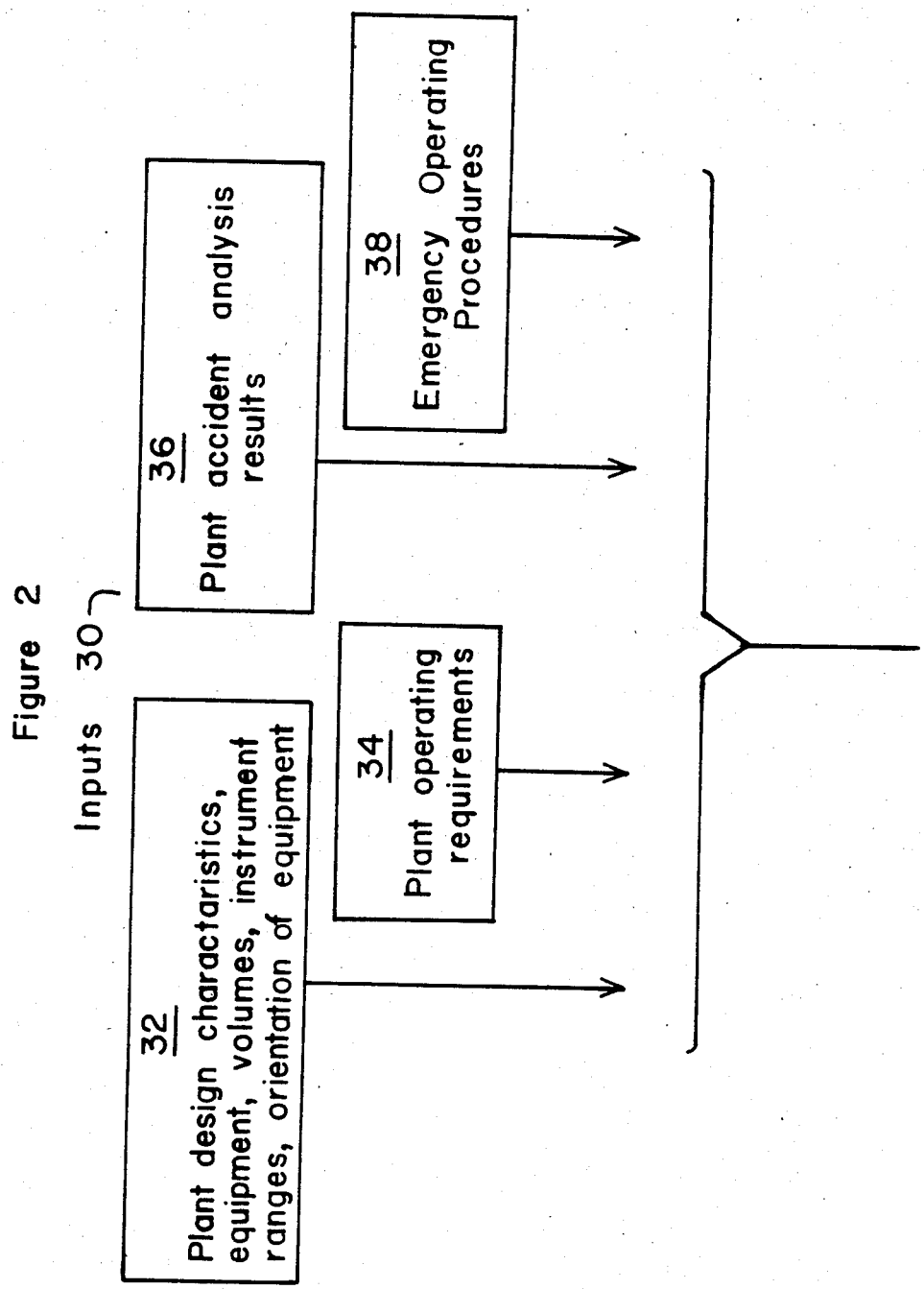
FIG. 2 is a diagram of inputs.

To determine the severity of any event which occurs in a nuclear plant, implement the subject process as diagrammed in FIGS. 2 and 3.

Input

The inputs (30) consist of details which characterize a particular nuclear generating station; these details include specific plant characteristics, including plant system volumes, power levels, instrumentation types and ranges, equipment types, locations and orientations, performance characteristics of plant systems and components, and other basic information which are fixed parameters associated with each machine (nuclear power plant), such as plant operating requirements (34), plant accident analysis results (36), and emergency operating procedures (38).

The process is generally as follows:

Step 1

Functional criteria for each fission product barrier are quantitative definitions of barrier function established by the process.

To establish the functional criteria the relationship of $$\text{Dose} \alpha f(L_F) \times f(L_{RCS}) \times f(L_C)$$

is employed. Specifically, the allowable leakage of either the reactor coolant system or the containment is initially chosen to be a specific value based upon plant characteristics associated with the particular nuclear power plant of interest. For all reactor types this leakage value is set significantly above allowable leakage rates permitted for continuous, normal plant operation.

Generally, for pressurized water reactors the reactor coolant system leakage limit is determined by the pumping capability of the reactor water purification charging pumps. For boiling water reactors the leakage limit is determined by the ability of plant instrumentation to detect leakage within the containment with high confidence. Typical limits of reactor coolant system leakage are in the 100 gallon per minute range; however, plant-specific parameters determine the specific values for a particular plant.

The function of each fission product barrier is to prevent the transport of large amounts of radioactive material to the environment. The adequacy of the barrier is demonstrated by the absence of an indication of such transport of radioactive materials. As a practical matter, limiting the amount of material which may be transported across each barrier is related to the characteristics of each nuclear power plant's site. If all fission product barriers are functional the consequences associated with the transport of radioactive material to the environment will be limited to a value below that stated in federal regulations which prohibit radiation doses to the public in excess of certain values. The process entails selection of allowable reactor coolant system leakage based upon system characteristics, the selection of containment leakage, and the calculation of the concentration of radioactive materials in the reactor coolant system which corresponds to and is indicative of loss of function of the reactor coolant system as a fission product barrier.

The Code of Federal Regulations, Title 10, Part 20, identifies limits of exposure of personnel to radioactive materials. Exposures to the general public are to be limited such that the total exposure will be maintained below 500 millirems per year for an individual located at the boundary of a nuclear power plant site. A preliminary initial value of the containment leak rate which corresponds to a breach of the containment fission product barrier is selected to be four times the allowable total leakage permitted by Title 10, Part 50, Appendix J, or two percent by volume per day, by the process.

The formulas $$D = K_i \times X/Q \times R$$

$$R = f(L_C) \times f(L_{RCS}) \times C_{RCS} \text{ or, restating,}$$

$$D = K_i \times X/Q \times f(L_C) \times f(L_{RCS}) \times C_{RCS} \text{ or}$$

$$C_{RCS} \alpha (D)/f(L_C)$$

are used to determine $C_{RCS}$ where
- D = Dose at the site boundary, set at 500 millirems per year;
- $K_i$ = Dose conversion factor for the radioactive material released;
- X/Q = Diffusion coefficients relating average meteorologic conditions to detection of a release as measured at the site boundary;
- $f(L_C)$ = a function of leak rate of containment;
- $f(L_{RCS})$ = function of leak rate of the reactor coolant system;
- $C_{RCS}$ = Concentration of radioactive material in the reactor coolant system.

Since the values of $f(L_{RCS})$ and $f(L_C)$ have been set at initial values related to plant system characteristics and requirements, the value of $C_{RCS}$ is determined employing the above relationship.

Typical values of $C_{RCS}$ determined by this approach are in the range of 500 microcuries per cubic centimeter for power reactors. These initial values are employed as test values which are refined by the process to develop final criteria which define fission product barrier function.

Step 2

The process utilizes input information to develop a detailed plant-specific diagram similar to FIG. 1 in which normal operating limits, normal operating conditions, volumes, system physical parameters, and specific monitoring parameters and their ranges of indication by specific instruments are identified. The result of this step is a composite diagram of all possible symptom indicators available within a nuclear generating station to aid analysis of any emergency event's actual level of hazard, using the process. These symptom indicators are related to the three fission product barriers by the process.

Step 3

The response of each process parameter monitor is evaluated for an assumed breach of each fission product barrier. The response as a function of time is determined employing simplifying assumptions such as uniform instantaneous mixing, normal average plant conditions prior to the assumed breach, system performance at specified values, instantaneous transition from normal fission product barrier performance to a degraded condition, absence of equipment failure, and operation in accordance with license conditions. The existence of the three fission product barriers results in eight possible combinations of individual barrier failures. Each possible combination is evaluated on the basis of the results described.

Step 4

The results of Step 3 are considered to determine if unique, pervasive, and unambiguous symptoms associated with each combination of barrier failure are attained. If such symptoms are not obtained the functional criteria associated with each barrier are modified either by increasing or decreasing the allowed leakage or parameter associated with determination of function. The process of Steps 2, 3, and 4 is repeated until the objective of determining unique symptoms is accomplished for each possible fission product barrier combination.

Step 5

Upon completion of the development of a set of fission product barrier functional criteria which yield unique symptoms, the various accidents addressed in the facility safety analysis, regulatory guidance or commitments to regulatory guidance are evaluated to identify which if any of the fission product barrier criteria as determined in Steps 1 through 4 would be satisfied by the conditions associated with such events. Realistic accident analysis results are employed such that the comparison to barrier function is a comparison of best engineering estimates to the functional criteria. (Typical accident analyses are very conservative and as such tend to significantly overestimate the consequences of specific events. Best engineering estimates are employed in this evaluation of consequences of accident events so as to provide the most reasonable correlation to what would be experienced in real time during an actual event.)

Step 6

The criteria for event classification by the process determines the number of fission product barriers which have been breached and relates the event classification to that number. Established regulatory guidance and agreements between federal regulatory agencies and individual utilities identify specific perceived levels of event classification for the various accidents addressed in Step 5. That perceived level of event classification is compared to the level of event classification determined in Step 5 employing the set of fission product barrier functional criteria developed by Steps 1 through 4. The objective of this comparison is to identify all direct agreements and inconsistencies between classification employing the functional criteria and perceived classification. Each inconsistency is evaluated to determine the actual level of hazard. Best engineering estimates are employed in the evaluation of each inconsistency to determine if the perceived hazard level of established guidance and agreements is correct.

The influence of time is included in this evaluation, i.e., events which may result in subsequent degradation of safety, should no mitigating actions be taken, are evaluated to determine the best estimate of the relationship between safety degradation and time (without mitigation).

Inconsistencies are either determined to be preemptive over-conservatisms or errors in the perceived hazard as noted in guidance or commitments, or deficiencies in the criteria associated with fission product barrier function. In the event of the identification of a deficiency in the criteria associated with fission product barrier function the process Steps 1 through 6 are repeated with modified criteria until all inconsistencies are removed or determined to be due to presumptive over-conservatism or errors in the guidance or commitments.

Step 7

Commensurate with the performance of Steps 5 and 6, the emergency operating procedures for the nuclear generating facility are evaluated to identify symptoms which by best engineering estimates are indicative of conditions which indicate imminent degradation of safety as manifested by functional loss of a fission product barrier. (Example: Temperature indication above the fuel cladding temperature threshold for rapid strain-related clad creep due to internal pressure is indicative of the onset of rapid swelling and rupture of fuel cladding which will be manifested by a transport of radioactive material to the reactor coolant system at a near future time.) Such precursor indications to functional loss of fission product barriers are identified as additional conditions which are deemed to constitute indications of barrier breach and are added to the criteria of Step 1. The process Steps 1 through 6 are accomplished including such additional precursor indications.

Step 8

The final fission product barrier functional criteria as determined by completion of the process Steps 1 through 7 above are identified and presented in a definitive statement for each fission product barrier.

Step 9

A symptom description of each possible combination of fission product barrier breaches is developed employing those indications identified in Step 3 as being key indications of barrier function. Step 2 identified all possible indications; this step identifies those indications which are useful in determining the overall status of the three fission product barriers. Each indicator which responds to a fission product barrier breach as determined by Step 3 is included in the set of key indicators of barrier status. The response of each of these key indicators to the particular fission product barrier breach associated with the indicator is included in the symptom description of that barrier's breach. Upon completion of this step a logic matrix similar to FIG. 5 is developed. This logic matrix identifies each symptom which is indicative of status of any fission product barrier. The detailed logic matrix includes the conditional symptoms which when combined with other symptoms are also indicative of the status of a particular fission product barrier. The logic matrix enables programming of the computer to classify emergency events or to act as a decisional aid to the operator in classifying events.

FIG. 4 presents the steps in real time application of the process.

Step R-1.

Plant emergency symptoms are recognized by the computer or by operators within the control room using plant process and radiation monitoring information related to the key indicators identified in the logic matrix (FIG. 5);

Step R-2.

Operators implement emergency operating procedures to mitigate the symptoms of the emergency event and to assess the magnitude of hazard to each fission product barrier. Symptoms which are indicative of conditions which cannot be mitigated prior to the breach of a fission product barrier are identified by such procedures. Such symptoms are additional input to the computer and are included within the computerized logic matrix.

Step R-3.

The computer and the operator correlate the composite of recognized symptoms to the specific symptoms listed in FIG. 5 and to the status of the three fission product barriers. Specific symptoms relative to the loss of each barrier are determined to exist or not exist. The logic matrix which describes the symptoms associated with all possible combinations of fission product barrier breach is used.

Step R-4.

The computer or operator assesses barrier status by reviewing of the correlation developed in Step R-3. The existence of a condition which by definition constitutes the breach of a barrier or the persistent indication of subsequent manifestation of symptoms indicative of fission product barrier breach are identified for each barrier. In addition, when only one barrier is functional, the computer or operator evaluates the relationship between indications, rates of change of indications, and mitigation activities to assess the capability to mitigate symptoms related to impending breach of the functional fission product barrier. The evaluation estimates the time remaining to barrier breach for the specific conditions indicated by the symptoms if such symptoms are associated with a degradation process which cannot be mitigated. When the time to barrier breach is less than the time required to implement offsite protective actions the condition is presummed to be indicative of barrier breach and breach of that remaining barrier is deemed to occur for the purpose of event classification. Offsite protective actions include notification of offsite authorities, mobilization of emergency response personnel, and evacuation of the general population at risk due to the event.

Step R-5.

The computer and the operator classify the emergency event by counting the number of fission product barriers which have exhibited definitive indications of an imminent loss of function, and then applying the following relationship:

One fission product barrier breached—Alert
Two fission product barriers breached—Site Area Emergency
Three fission product barriers breached—General Emergency Step R-6.

Operators direct their mitigation activities toward the remaining functional fission product barriers so as to optimize the level of protection from release of radioactive materials to the environment.

Step R-7.

The computer automatically alerts offsite authorities and notifies them of the emergency classification determined by the process.

Examples of symptoms which are identified to be indicative of barrier breaches are noted in the table in FIG. 5. Some of the exemplary symptoms which are identified and sensed provide indications of one or more barriers breached and some symptoms when compared to normal indications provide indications of one or more specific barriers breached. The absence of such symptoms indicated no barriers breached, which is the desired condition.

In preferred embodiments of the invention, the conditions are identified so that the sensing of conditions associated with breaches provide at least orders of magnitude increases in indications or off-scale indications in comparison to normal conditions so that a positive response follows rather than just an indication of a slight change in measured parameters.

The preferred response includes the controlling of signaling which in alternative embodiments is the off-scale indications of groups of indicators, lamps, sound, printer, computer display and telecommunications of particular barriers breached and of levels of emergency according to numbers of barriers breached. In particular embodiments of the invention, signals are given upon the sensing of identified conditions which are positive identifications of impending breach of one or more barriers.

In preferred embodiments of the invention, the mitigating activities controlled by the response are the controlling and setting up of machines and circuits to transfer heat specifically by depressurizing and/or adding water.

In preferred embodiments of the system, the mitigation equipment operates machines and sets up circuits to use functional unbreached barriers.

Once the mitigation equipment has begun functioning the equipment continues to function until conditions within the plant permit repair of the breached barrier to a fully functional status.

While the invention has been described with reference to specific embodiments, modifications and variations of the invention may be constructed without departing from the scope of the invention. The scope of the invention is defined in the following claims.

What we claim is:

1. The method of classifying emergency levels in operation of nuclear power plants comprising relating offsite radiation dose to the public to functioning of sequential encompassing barriers A, B and C, the relating step comprises relating the offsite does to the public according to the relationship:

$$\text{Dose } f(\phi, t_o, u/p, t_d) \times f(w) \times f(s) \times f(L_F) \times f(L_{RCS}) \times f(L_C)$$

$f(\phi, t_o, u/p, t_d)$ is a source term, a value related to the amount of radioactive material which exists in the fuel, the form of that material, and the volatility of the material. The source term is related to reactor power, $(\phi)$,; to time of operation, $(t_o)$; to fuel characteristics, $(u/p)$; to time after shutdown, $(t_d)$; among other factors; $f(w)$ is a function related to meteorological conditions at the time of release of radioactive materials; $f(s)$ is a function of site demographic characteristics;

And where relatively variable functions are:

$f(L_F)$ is a function of the leak rate of the reactor fuel cladding;

$f(L_{RCS})$ is a function of the leak rate of the reactor coolant system;

$f(L_C)$ is a function of the leak rate of the containment.

2. The method of claim 1 wherein the relating step comprises calculating the function of the fuel barrier $f(L_F)$.

3. The method of claim 1 wherein the relating step comprises calculating the function of the coolant barrier $f(L_{RCS})$.

4. The method of claim 1 wherein the relating step comprises calculating the function of the containment barrier $f(L_C)$.

5. The method of calculating concentration of radioactive material within a coolant barrier corresponding to fuel barrier breach for the purpose of initial designation of criterion of fuel breach according to the equation $$C_{RCS} \alpha D/f(L_C)$$

where

D = Dose at the site boundary, set at 500 millirems per year;

$f(L_C)$ = function of the leak rate of the containment;

$C_{RCS}$ = Concentration of radioactive material in reactor coolant system.

6. The method of claim 5, wherein the concentration of radioactive material in the reactor coolant system is expressed in the form:

$$C/E$$

where

C = concentration in uCi/gm.

E = average energy of photon emission from the radioactive material.

7. The method of classifying emergency levels in operation of nucelar power plants comprising relationg possible offsite radiation dose and hazard to the public to functioning of sequential encompassing barriers, fuel cladding, reactor coolant system, and containment, the method comprising, calculating $f(L_F)$, wherein $f(L_F)$ is a function of the leakage rate of the fuel cladding, calculating $f(L_{RCS})$, wherein $f(L_{RCS})$ is a function of the leakage rate of the reactor coolant system, calculating $f(L_C)$, wherein $f(L_C)$ is a function of the leakage rate of the containment relating possible offsite does to the public according to the calculated functions $f(L_F)$, $f(L_{RCS})$, and $f(L_C)$, and indicating an emergency level based on the relating of the magnitudes of the functions $f(L_F)$, $f(L_{RCS})$, and $f(L_C)$, to predetermined acceptable magnitudes of the functions $f(L_F)$, $f(L_{RCS})$, and $f(L_C)$, wherein the acceptable magnitudes are based upon possible offsite dose consequences.

* * * * *